United States Patent [19]
Alexander

[11] Patent Number: 6,139,242
[45] Date of Patent: *Oct. 31, 2000

[54] VEHICLE RESTRAINT WITH SECURITY DEVICE

[75] Inventor: James C. Alexander, London, Canada

[73] Assignee: United Dominion Industries, Inc., Charlotte, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/840,787

[22] Filed: Apr. 16, 1997

[51] Int. Cl.$^7$ ................................. B65G 69/00
[52] U.S. Cl. ........................... 414/401; 414/584
[58] Field of Search ................... 414/396, 401, 414/584; 14/71.1, 71.3, 71.7

[56] References Cited

U.S. PATENT DOCUMENTS

| | | | |
|---|---|---|---|
| 4,648,781 | 3/1987 | Sikora | 414/401 |
| 4,759,678 | 7/1988 | Hageman | 414/401 |
| 4,767,254 | 8/1988 | Kovach et al. | 414/401 |
| 4,830,563 | 5/1989 | Yeakle | 414/401 |
| 4,963,068 | 10/1990 | Gelder | 414/401 |
| 5,026,242 | 6/1991 | Alexander | 414/401 |
| 5,071,306 | 12/1991 | Alexander | 414/401 |
| 5,297,921 | 3/1994 | Springer et al. | 414/401 |
| 5,336,033 | 8/1994 | Alexander | 414/401 |
| 5,505,575 | 4/1996 | Alexander | 414/401 |

*Primary Examiner*—Douglas Hess
*Attorney, Agent, or Firm*—Sughrue, Mion, Zinn, Macpeak & Seas, PLLC

[57] ABSTRACT

A vehicle restraint for preventing movement of a vehicle from a parked position has a frame mountable at a loading dock to position a vehicle restraint mechanism operably coupled to the frame. The vehicle restraint mechanism has a restraining member with at least one hook movable between a lower inoperative position where said restraining member is out of contact with a vehicle to be restrained and an upper operative position where the restraining member contacts said vehicle and prevents movement from a parked position. A source of power, such as an actuator moves the restraining member upward to the operative position by having linkage coupling the source of power to the restraining member. A resilient member is coupled to the linkage and biases the restraining member into engagement with the vehicle. A security member is movable from a stored position to a blocking position preventing movement of the linkage in one direction thereby preventing the restraining member from lowering into the inoperative position and a spring member biases the security member into engagement with the linkage to prevent downward movement of the restraining member.

15 Claims, 12 Drawing Sheets

VEHICLE RESTRAINT WITH SECURITY DEVICE

BACKGROUND OF THE INVENTION

This invention relates to loading dock equipment. In particular, it is directed to a vehicle restraint which has a security device to prevent unauthorized removal of a trailer from a loading dock.

PRIOR ART

The use of a vehicle restraint as a safety device to prevent a truck or trailer from inadvertently moving away from a loading dock is well known. Most vehicle restraints consist of a hook shaped member which is placed in front of the ICC bar of a trailer to limit horizontal motion. To accommodate vertical motion caused by suspension deflection under varying loads, the hook is usually spring biased upward to maintain contact with the ICC bar.

Although safety at the dock is an obvious requirement, another serious problem for shippers is the theft of trailers which are left unattended at a loading dock. This is of particular concern when the cargo is of high value. For example, a trailer loaded with alcohol, tobacco or consumer electronic products may have a value exceeding a half million dollars. A vehicle restraint typically has the strength to prevent a trailer from being pulled away from the dock, but because the restraint is usually spring biased upward to maintain contact with the ICC bar, the hook portion can be deflected downward to disengage the ICC bar and allow the trailer to be removed.

Some vehicle restraints have been used to discourage theft of an unattended trailer by preventing the hook from disengaging the ICC bar. In these situations an operator is required to climb under the rear of the trailer and install a padlock or other locking device. This is usually an awkward location to access, wet and dirty in inclement weather, and potentially unsafe. Also the difficulty of installation and removal of the locking device may discourage consistent use and allow the trailer to remain unsecured. Additionally, the use of many of these locks essentially disables the vehicle restraint so that if loading operations resume without removing the lock, potential damage can occur to the restraint or the device may bind on the ICC bar.

SUMMARY OF INVENTION

This invention is a vehicle restraint which incorporates a security device to deter the disengagement of the restraint from the ICC bar of the trailer. It also provides for the electrical monitoring of the device to warn of tampering.

This invention does not compromise the primary safety function of the vehicle restraint, to secure the trailer at the loading dock. It however extends the utility of these devices by providing an addition aspect of functionality, namely a theft prevention device at the same time.

As with any security device, it is understood that this invention cannot prevent the forcible removable of the trailer by extreme unlawful measures such as cutting the ICC bar on the trailer or mechanically disassembling the vehicle restraint. However, it does offer a significant deterrent to theft by making removal of the vehicle restraint more difficult, time consuming and potentially hazardous itself as a part of any theft. In addition, attempts to tamper with the device will activate switches which may be used to enable an alarm system.

It is therefore an object of this invention to provide a vehicle restraint that has an integral security system used in conjunction with the actuating mechanism that can automatically initiated.

Yet another aspect of this invention is to provide a vehicle restraint having a security system which does not require the operator to manually place or insert additional elements onto the restraint to secure it as a theft prevention device.

In accordance with this invention a vehicle restraint is provided to prevent movement of a vehicle from a parked position has a frame mountable at a loading dock to position a vehicle restraint mechanism operably coupled to the frame. The vehicle restraint mechanism has a restraining member with at least one hook movable between a lower inoperative position where said restraining member is out of contact with a vehicle to be restrained and an upper operative position where the restraining member contacts said vehicle and prevents movement from a parked position. A source of power, such as an actuator moves the restraining member upward to the operative position by having linkage coupling the source of power to the restraining member. A resilient member is coupled to the linkage and biases the restraining member into engagement with the vehicle. A security member is movable from a stored position to a blocking position preventing movement of the linkage in one direction thereby preventing the restraining member from lowering into the inoperative position and a spring member biases the security member into engagement with the linkage to prevent downward movement of the restraining member.

This invention will be described in greater detail by referring to the attached drawing and the description of the preferred embodiment that follows.

DESCRIPTION OF THE PREFERRED EMBODIMENTS

Referring now to FIGS. 1–7 a first preferred embodiment of this invention will be described. The general description of the vehicle restraint components per se are same as found in U.S. Pat. No. 5,336,033, commonly assigned, which is expressly incorporated herein by reference. Particular attention in the '033 patent is directed to FIGS. 6–8 for a desription of the operation of that device.

Figure 1:
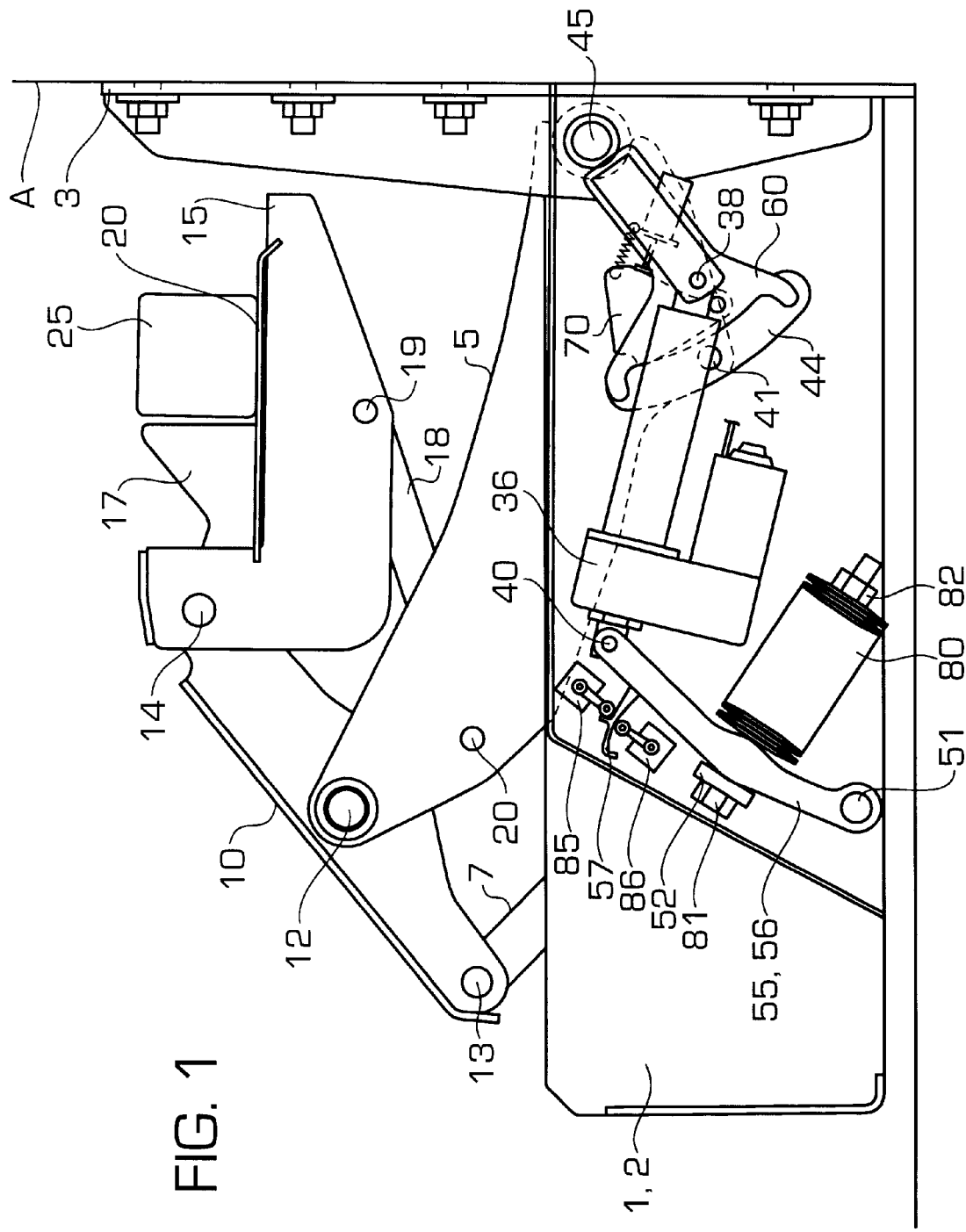
FIG. 1 is a side view, partially cutaway, illustrating the vehicle restraint in a normal operative position in accordance with a first preferred embodiment of this invention.
Figure 2:
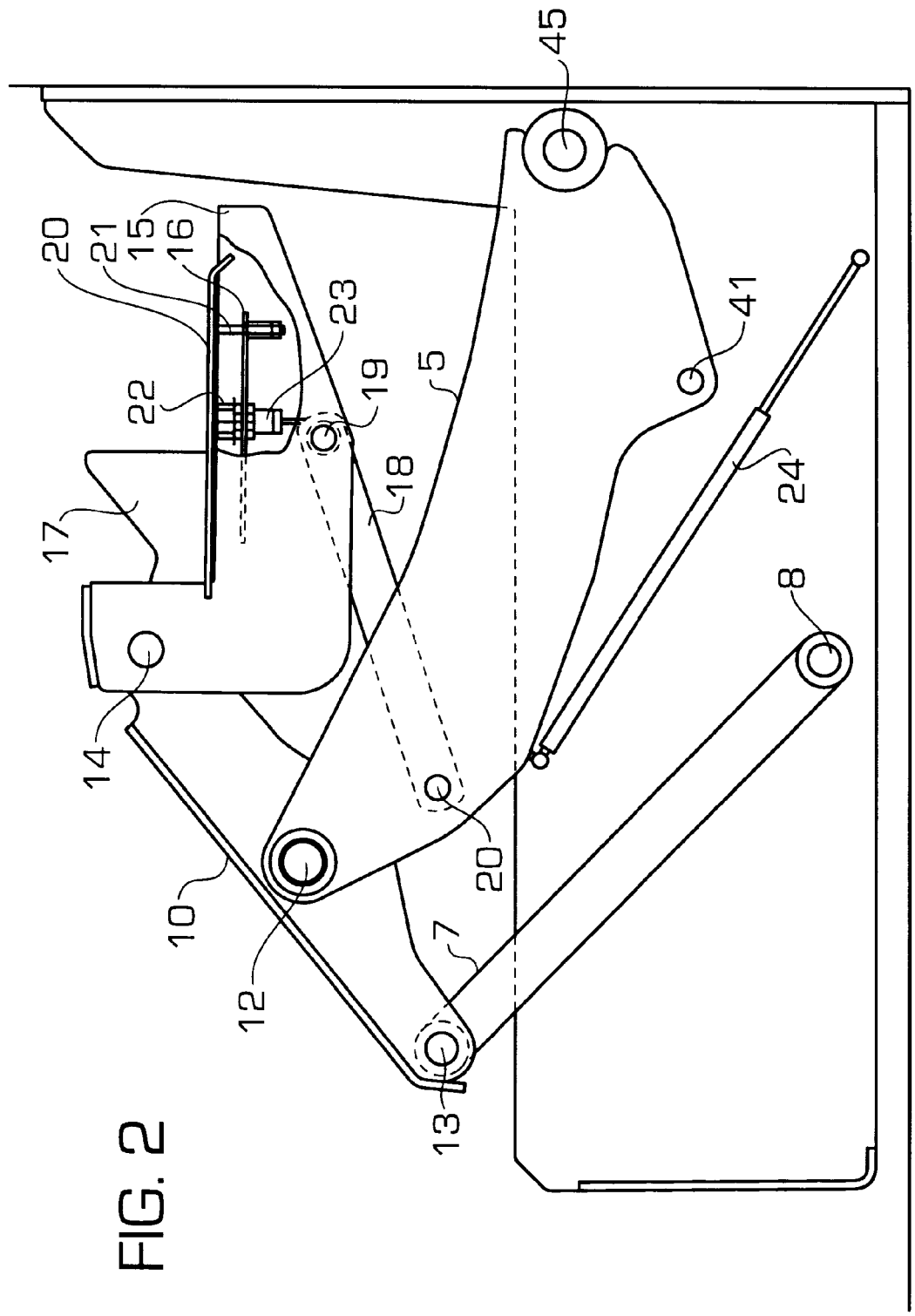
FIG. 2 is a sectional side view showing the restraint mechanism of the first preferred embodiment.

A vehicle restraint assembly is mounted on a dock wall 'A' with the hook assembly 15 biased upwardly to engage the ICC bar 25 of a trailer as shown in FIG. 1. FIG. 2 is a sectional view of the vehicle restraint showing the restraint mechanism. The main arm assembly 5 pivots about the shaft 45 mounted in the frame side plates 1 and 2, and is upwardly biased by a pair of gas springs 24. The upper arm assembly 10 is attached to the main arm assembly 5 by a pin 12 and to the front strut 7 by a pin 13. The front strut is anchored to the frame assembly side plates by a pin 8. The hook assembly 15 is mounted to the upper end of the upper arm by a pin 14 and is held horizontal by the hook struts 18 which are carried by pins 19 and 20.

The hook assembly 15 has a plate 16 which carries a sensor plate 20. The sensor plate is guided by a bolt 21 through the plate 16 and is biased upward by a spring 22. A limit switch 23 senses when the plate 20 is depressed by the ICC bar 25 and passes an electrical signal to a control panel (not shown) to indicate that the vehicle restraint has engaged the ICC bar 25.

Figure 3:
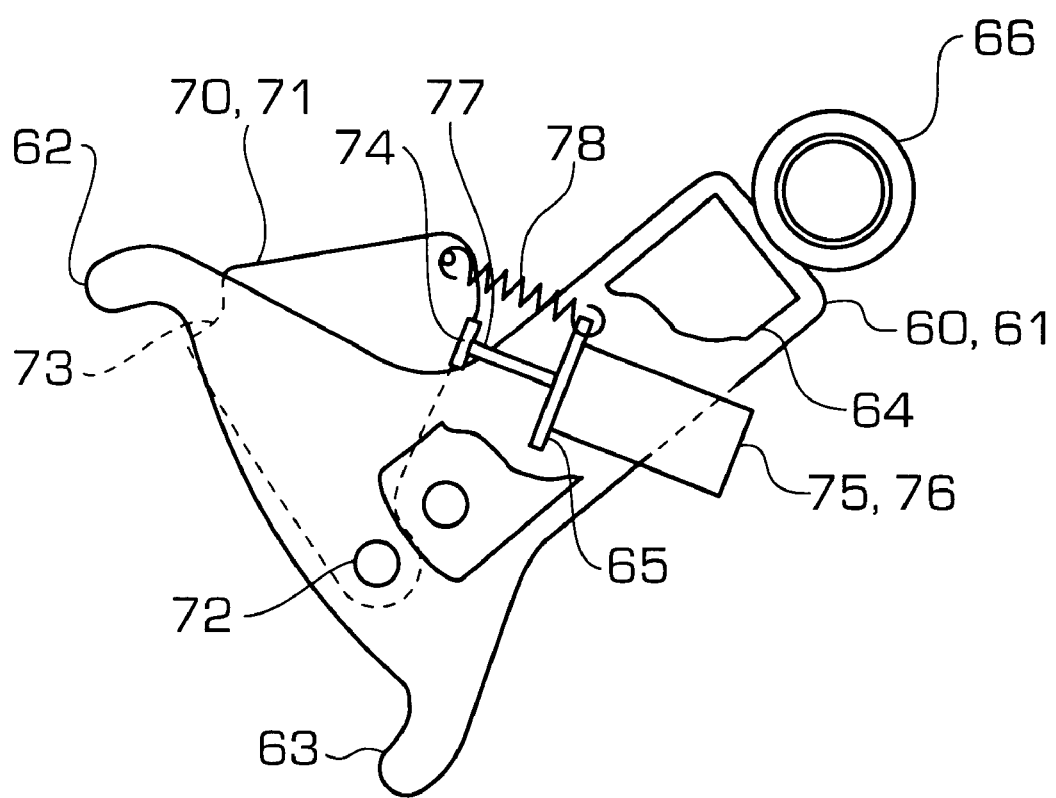
FIG. 3 is an enlarged view of the security locking components of the first preferred embodiment of this invention.
Figure 4:
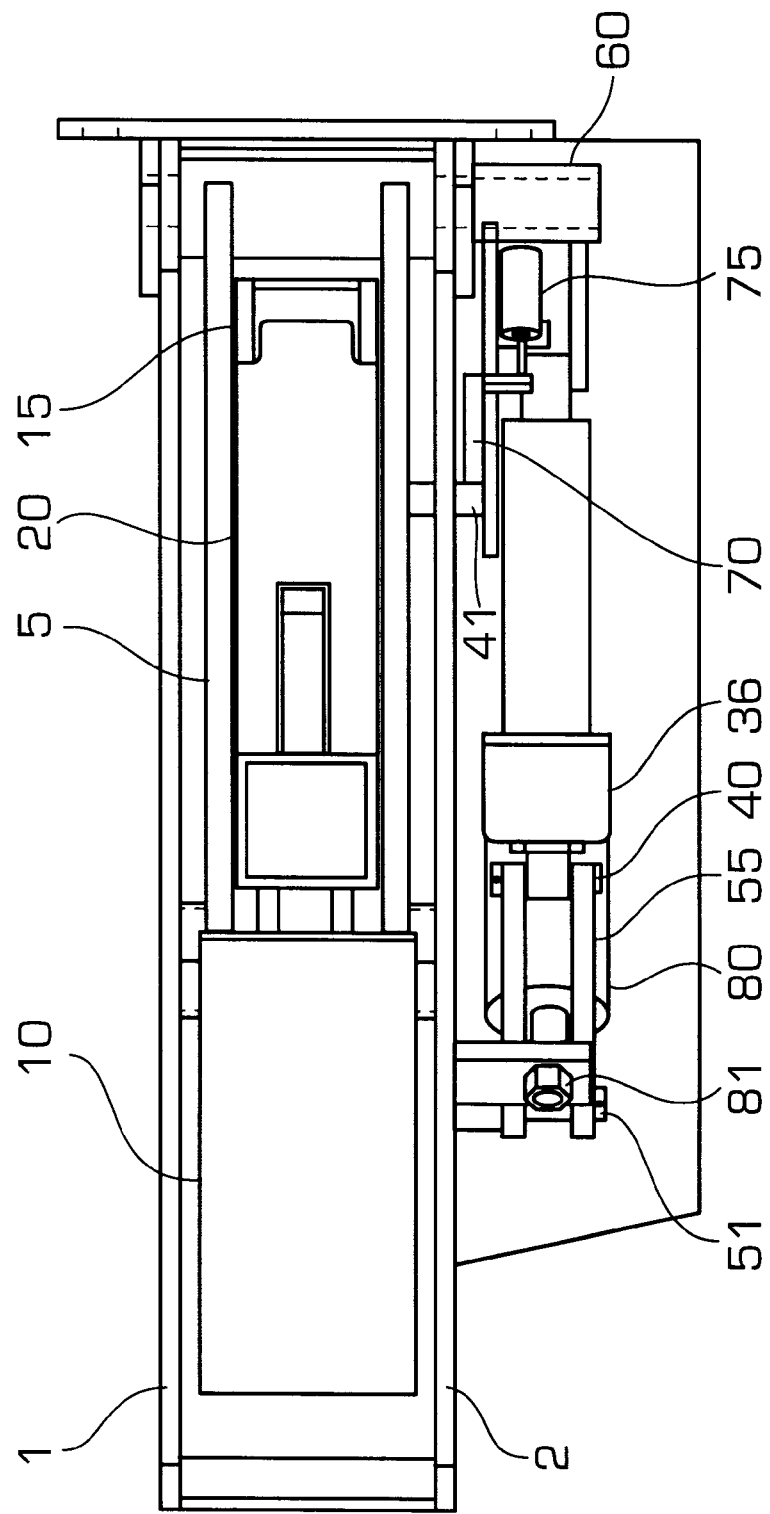
FIG. 4 a top view of the device in FIG. 1.

As shown in FIGS. 1, 2 and 3, the main arm assembly 5 carries a pin 41 which passes through a slotted hole 44 in the side plate 2. The sector plate assembly 60 pivots on the shaft 45 and has two lugs 62 and 63 which engage the pin 41 to control the rotation of the arm 5. When the vehicle restraint is in the normal operative mode, the sector plate assembly 60 is stationary and the pin 41 is free to move between the lugs 62 and 63 as the mechanism follows the vertical motion of the ICC bar.

FIG. 3 shows an enlarged view of the sector plate assembly 60 which comprises the sector plate 61, an arm 64, a mounting plate 65 and a bushing 66. A latch plate assembly 70 is carried on the sector plate 61 by a pin 72. The latch plate 71 has a latch surface 73 and an actuating lug 74. An electric solenoid assembly 75 has a housing 76 mounted to the plate 65 and an extendable plunger 77. A spring 78 holds the latch plate assembly 70 in an inoperative position against the retracted plunger 77. FIG. 1 also shows an actuator mounting arm assembly 55 with two arms 56 and a switch target bracket 57, The arm assembly is carried by a pin 51 mounted on the side plate 2. The arm assembly 55 is biased counter-clockwise against the lug 52 on the side housing 2 by the spring 80 which is compressed by the bolt 81 and nut 82.

An electrical actuator 36 has one end mounted to the end of the arm assembly 55 by the pin 40, and the other end fastened to the sector plate assembly by the pin 38. Two limit switches 85 and 86 are attached to the side plate 2. In the normal operative mode, the force of the spring 80 is sufficient to resist the operating forces of the actuator 36, maintaining the arm assembly 55 in contact with lug 52 and preventing the target bracket 57 from activating the limit switch 85.

Figure 5:
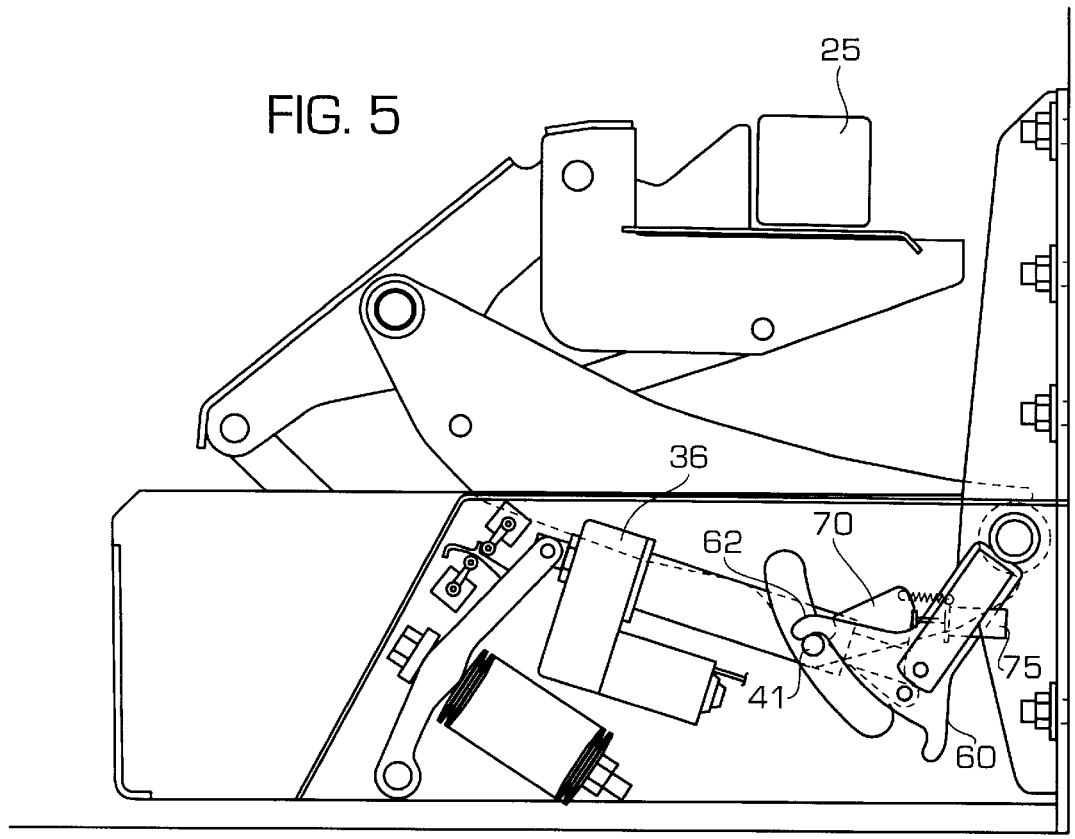
FIG. 5 is a side view illustrating the vehicle restraint of the first preferred embodiment in the first of three steps of engagement of the security system.
Figure 6:
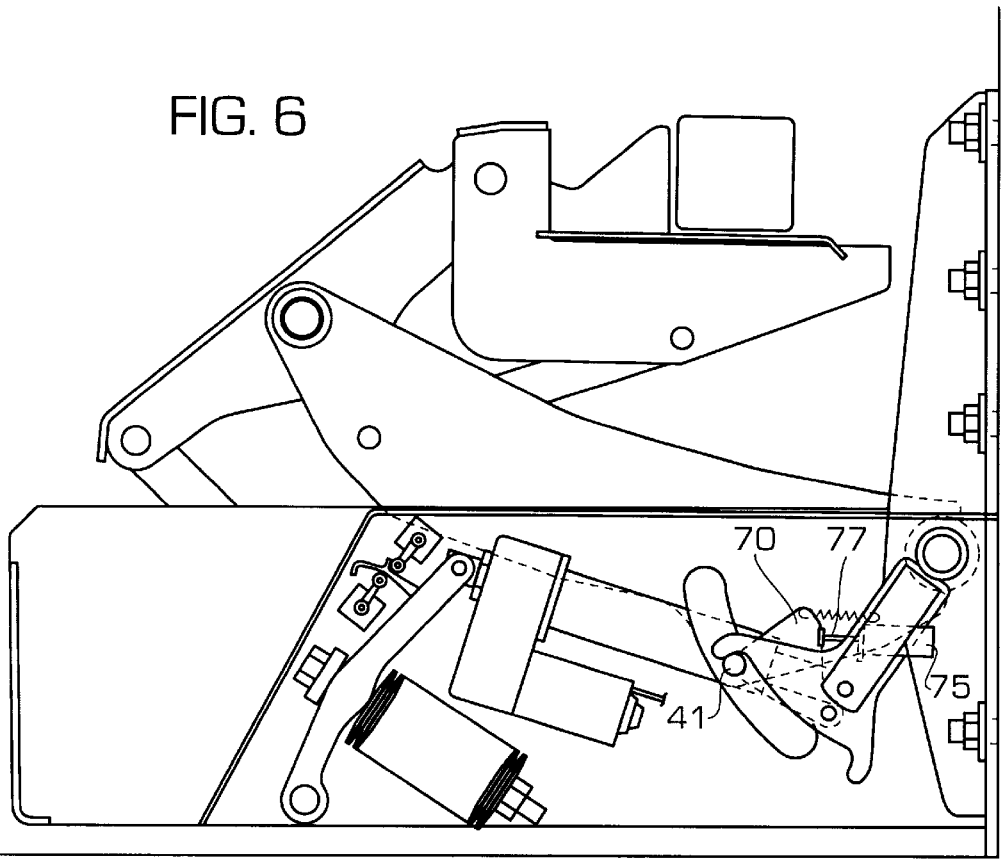
FIG. 6 is side view illustrating the vehicle restraint of the first preferred embodiment with the lock bar extended below the actuating pin of the restraint mechanism.
Figure 7:
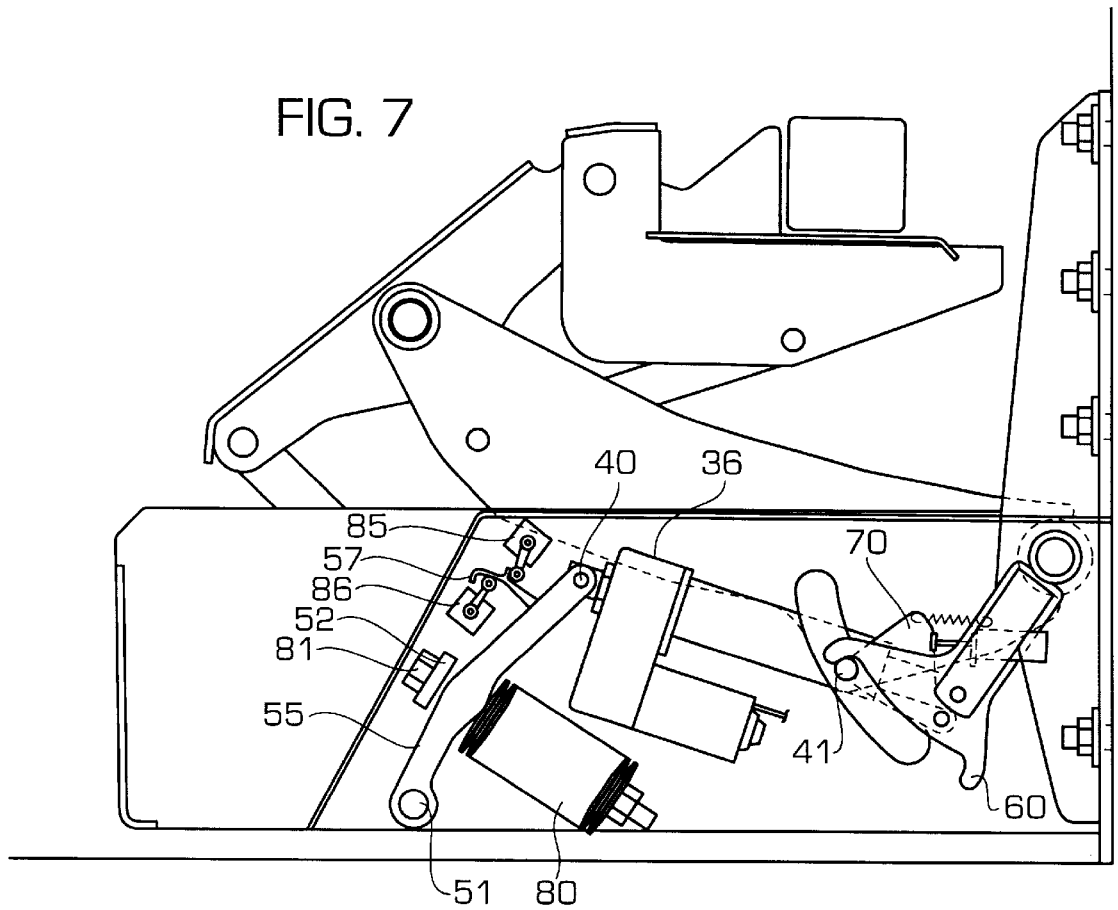
FIG. 7 is side view illustrating the vehicle restraint of the first preferred embodiment with the lock bar engaged to prevent the restraint mechanism from lowering.

FIG. 5 shows the vehicle restraint during the first step of activating the security feature. The functions of the vehicle restraint are controlled from a control panel (not shown), preferably using a programmable logic controller (PLC) which allows predetermined output functions depending on signals created by limit switches and control switches. When the security function is selected on the control panel, the electric actuator 36 extends until the lug 62 engages the pin 41. When the hook assembly 15 has been pulled from engagement with the ICC bar, the sensor plate 20 is raised by the spring 22 and the limit switch 23 no longer sends an electrical signal. The electric solenoid 75 is then energized and the plunger 77 forces the latch plate assembly 70 to rotate counterclockwise until it engages the pin 41 as shown in FIG. 7.

The actuator 36 then retracts and forces the lock surface 73 against the bottom of the pin 41, raising the hook assembly 15 upward. The actuator 36 continues to retract until the arm assembly 55 rotates forward and the target bracket 57 activates the limit switch 85 and the actuator 36 is stopped. Preferably the spring 80 has a dual spring rate so that the force of the actuator 36 is sufficient to move the arm assembly 55 to the position shown in FIG. 6, but any attempt to move the hook 15 downward to disengage the ICC bar will be resisted by significantly higher force. The purpose of the spring 80 is to maintain a high engagement force against the ICC bar yet allow downward deflection to compensate for settling of the trailer suspension without damaging the vehicle restraint mechanism.

Any attempt to raise the trailer or the ICC bar will allow the hook 15 to raise and cause the spring 80 to return the arm assembly to the initial position. The target bracket 57 will cease to engage the limit switch 85 and the electric actuator will again retract to maintain the upward force.

When the security mode is turned off, the actuator 36 extends again and the latch plate assembly 70 is retracted by the spring 78 to the position shown on FIG. 5. When the sensor plate 20 has lost engagement with the ICC bar 25, the actuator 36 then extends to the normal operative mode as shown in FIG. 1.

The vehicle restraint with the security device is also equipped with several features to detect tampering. The limit switches 23, 85 and 86 are normally open and are closed when activated. Thus cutting electrical wires or losing contact with the ICC bar will result in a loss of electrical signal to the control panel, and may be used to trigger an alarm system as illustrated in FIG. 1. Any attempt to raise the trailer or the ICC bar which causes the electric actuator to retract may also trigger the alarm system. Any attempt to force the hook 15 downward to disengage the ICC bar will cause actuator 36 to pull the arm assembly 55 farther clockwise and allow the target bracket 57 to activate the limit switch 86 and enable the alarm system.

A second embodiment of the security locking device is shown in FIGS. 8–12 with a retractable vehicle restraint assembly which is mounted in a recessed pit below the dock leveler. Reference is made to U.S. Pat. No. 5,505,575, which is expressly incorporated by reference, to illustrate and describe the basic structure and operation of that type of vehicle restraint.

Figure 8:
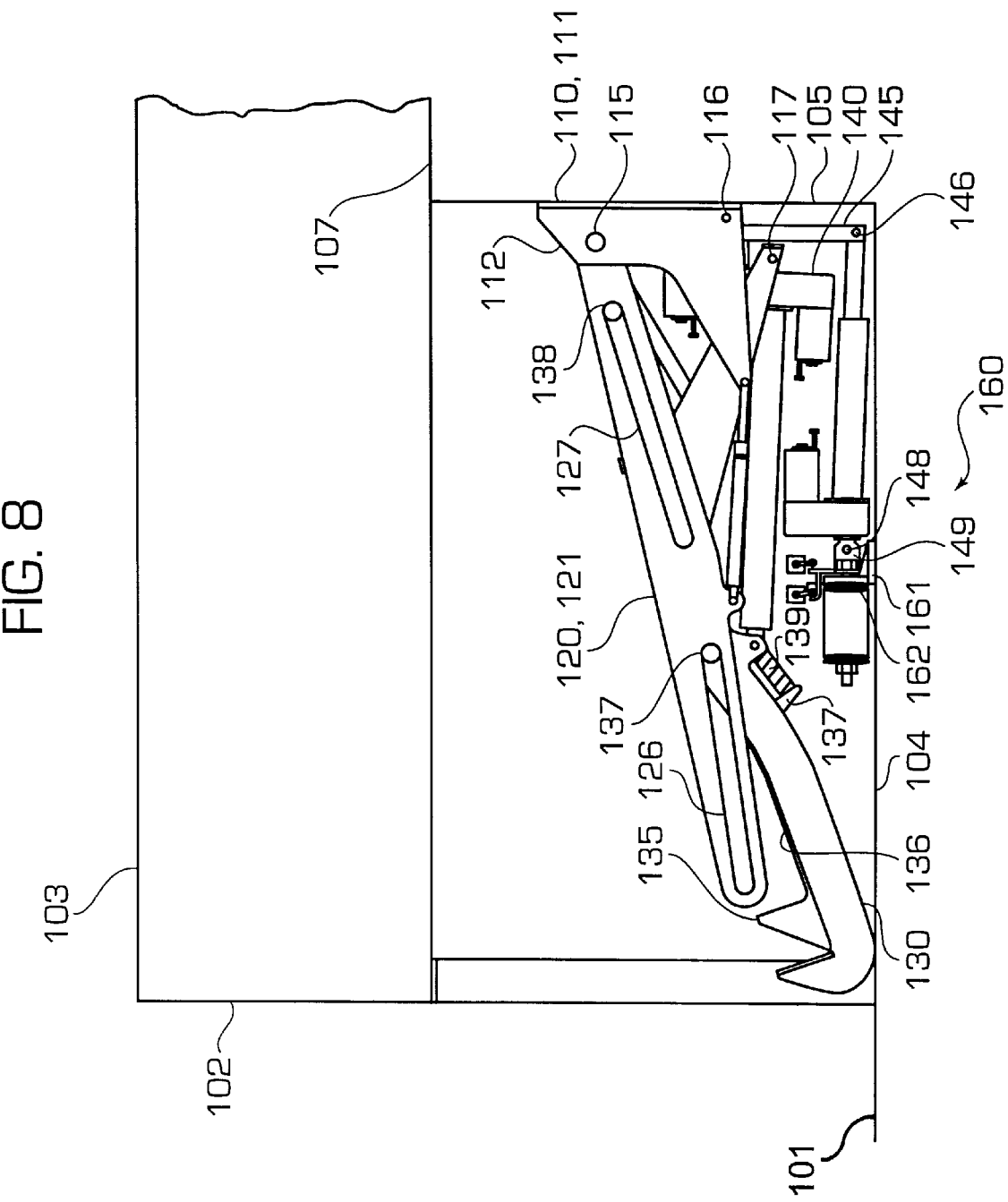
FIG. 8 is side view illustrating the second preferred embodiment of a vehicle restraint in a stored inoperative position.
Figure 9:
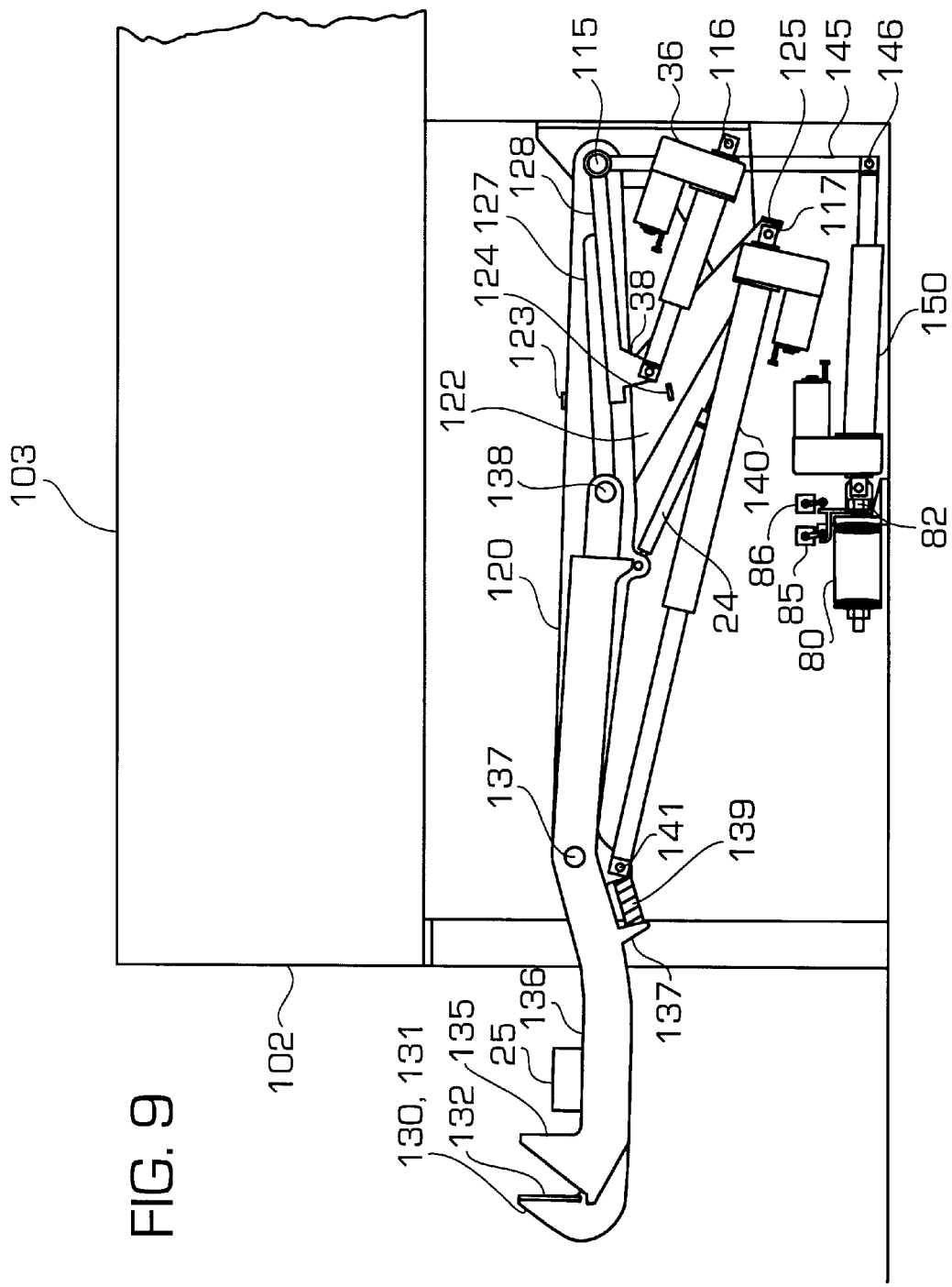
FIG. 9 is a sectional side view showing the restraint mechanism of the second preferred embodiment in the operative position.
Figure 10:
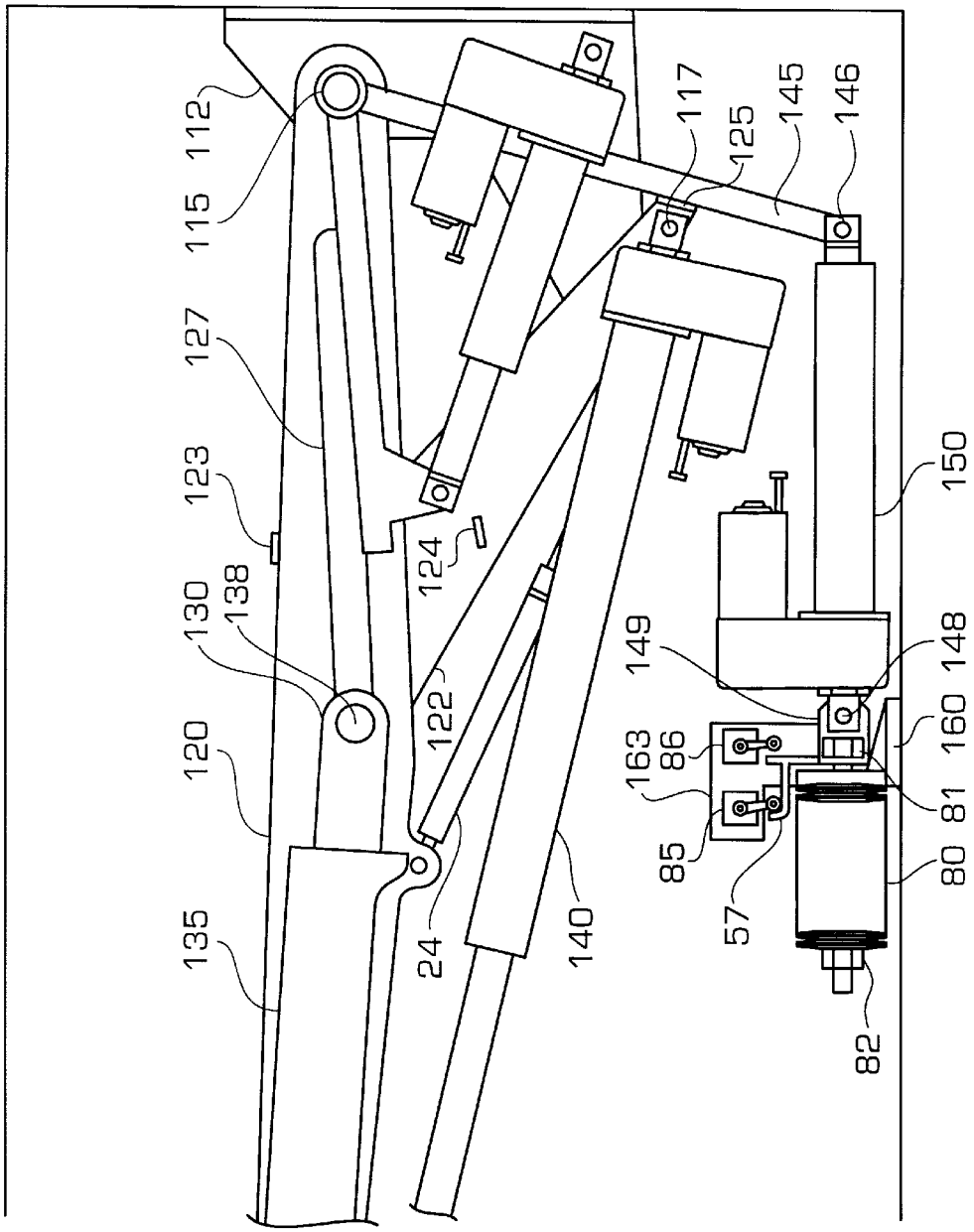
FIG. 10 is an enlarged view of the vehicle restraint of the second preferred embodiment with the security locking feature engaged.

FIG. 8 illustrates the vehicle restraint in a stored inoperative position. FIG. 9 illustrates a sectional view of the same vehicle restraint in the operative position engaging the ICC bar 25 of a transport vehicle. FIGS. 8 and 9 show a driveway 101, a dock face 102 and a dock floor 103. A pit 104 having a rear wall 105 is recessed under the dock floor 103. There may also be a larger pit 107 for a dock leveler not shown. The vehicle restraint has a frame assembly 110 having a back plate 111 which is attached to the rear wall 105. Two side plates 112 are attached to the back plate 111 and carry the other components of the vehicle restraint. A main arm assembly 120 pivots about a pin 115 which is carried by the side plates 112. The arm assembly 120 has two arms 121 and two support plates 122 which are joined together by the crossbars 123, 124 and 125 as shown in FIGS. 8 and 9. The arms 121 have two elongated slots 126 and 127 which carry pins 137 and 138. A pair of gas springs 24 have one end attached to the frame assembly 110 and the other end to the main arm assembly 120, causing the main arm assembly to be biased upward. An actuating arm 128 pivots on the pin 115. An electrical actuator 36 is attached to the frame assembly 110 by the pin 116 and to the actuating arm 128 by the pin 38. The end of the actuating arm 128 is positioned between the cross bars 123 and 124 and, when the actuator 38 is retracted, the end of the arm 128 engages the crossbar 124 and the main arm assembly 120 is held down in the stored position shown in FIG. 8.

A main hook assembly 130 has two side plates 131 joined by a plate 132. The hook assembly 130 is carried by the pins 137 and 138 and can be extended and retracted relative to the main arm assembly 120, guided by the slots 126 and 127. The motion of the main hook assembly 130 is controlled by a second electric actuator 140 which is attached at one end to the main arm assembly 120 by the pin 117 and at the other end to the main hook assembly 130 by the pin 141. A secondary hook 135 pivots about the pin 137 and is biased upward by the spring 139 which is compressed between the main hook assembly 130 and the lug 137 on the secondary hook 135.

The upper surface 136 of the hook 135 projects above the top surface of the main hook assembly 120 as shown in FIG. 8. When the main hook assembly 130 engages an ICC bar 25, as illustrated in FIG. 9, the surface 136 of the secondary hook 135 is depressed and the motion of the secondary hook is sensed by an electrical switch (not shown) to indicate contact with the ICC bar 25.

The security function is provided by the arm 145 which pivots about the pin 115 and is controlled by a third electric actuator 150 which is attached to the arm 145 by the pin 146. The other end of the actuator 150 is attached by the pin 148 to a clevis 149 which is held by a bolt 81 through a bracket assembly 160 attached to the floor of the pit 104. The bracket assembly 160 has a base plate 161, a vertical plate 162 and a limit switch mounting plate 163. The clevis 149 is held against the plate 162 by the compression spring 80 and the nut 82. Two limit switches 85 and 86 are attached to the plate 163, and a target bracket 57 is attached to the clevis 149.

The inoperative position of the arm 145 as shown in FIGS. 8 and 9 allows the vehicle restraint to function in the normal manner. When the vehicle restraint has engaged as ICC bar 25 and the security function is engaged, the actuator 150 pulls the arm 145 into contact with the crossbar 125, preventing the main arm assembly 120 and the hook assembly 130 from lowering. The actuator 140 retracts until the clevis 149 moves away from the plate 162 and the target bracket 57 activates the limit switch 85, stopping the actuator. Any attempt to move the hook assembly 130 downward to disengage the ICC bar 25 will be resisted by the force of the spring 80. As described earlier, the purpose of the spring 80 is to maintain a high engagement force against the ICC bar yet allow downward deflection to compensate for settling of the trailer suspension without damaging the vehicle restraint mechanism.

Any attempt to raise the trailer or the ICC bar will allow the hook assembly 130 to raise and cause the spring 80 to return the clevis 149 arm assembly to the initial position. The target bracket 57 will cease to engage the limit switch 85 and the electric actuator 140 will again retract to maintain the upward force. The limit switches 185 and 186 provide the same features to detect tampering as described previously. When the security mode is turned off, the actuator 140 extends again restores the arm 145 to the inoperative position shown in FIG. 9.

Figure 11:
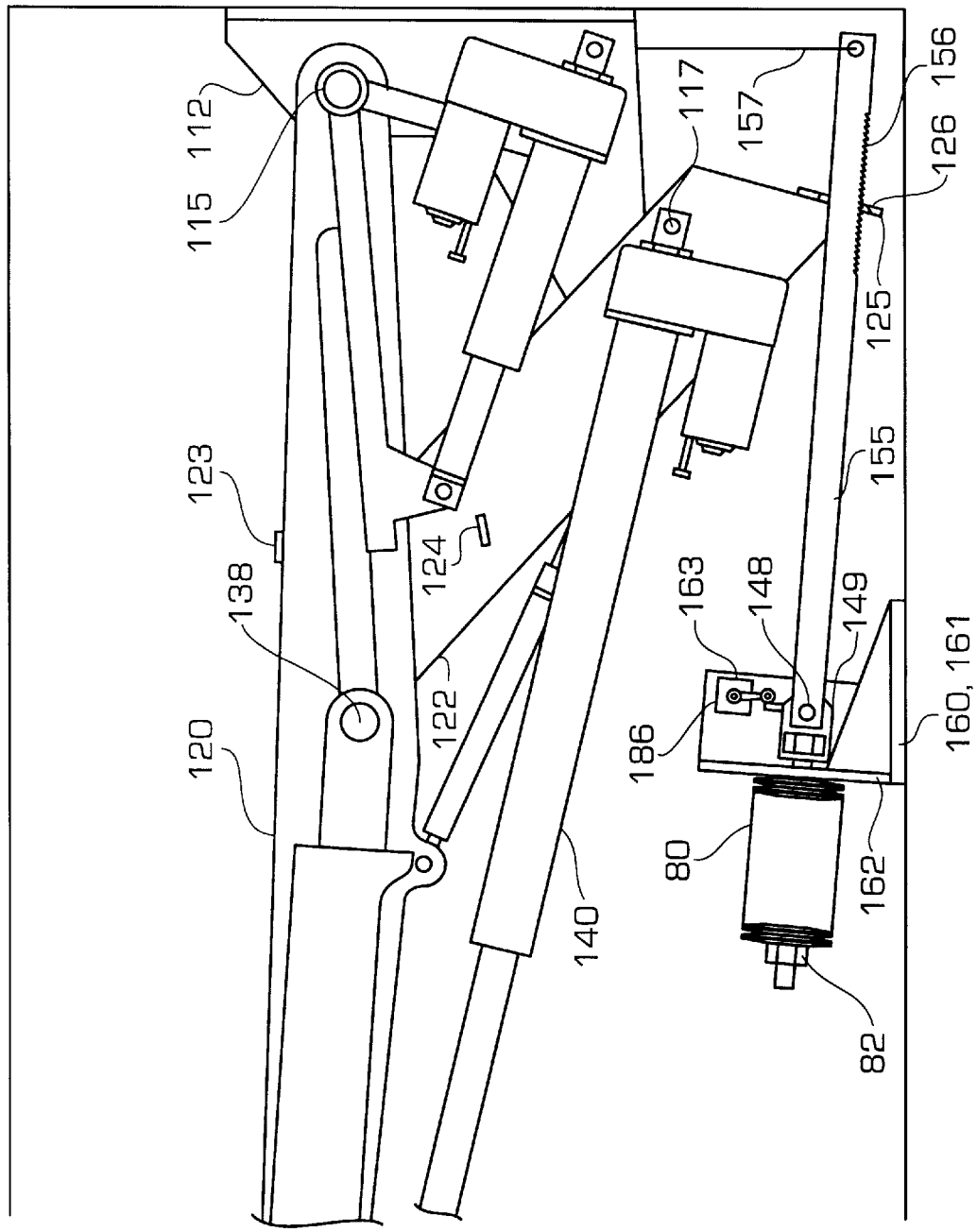
FIG. 11 is an enlarged view of the vehicle restraint of the second preferred embodiment with a modification of the security locking feature.
Figure 12:
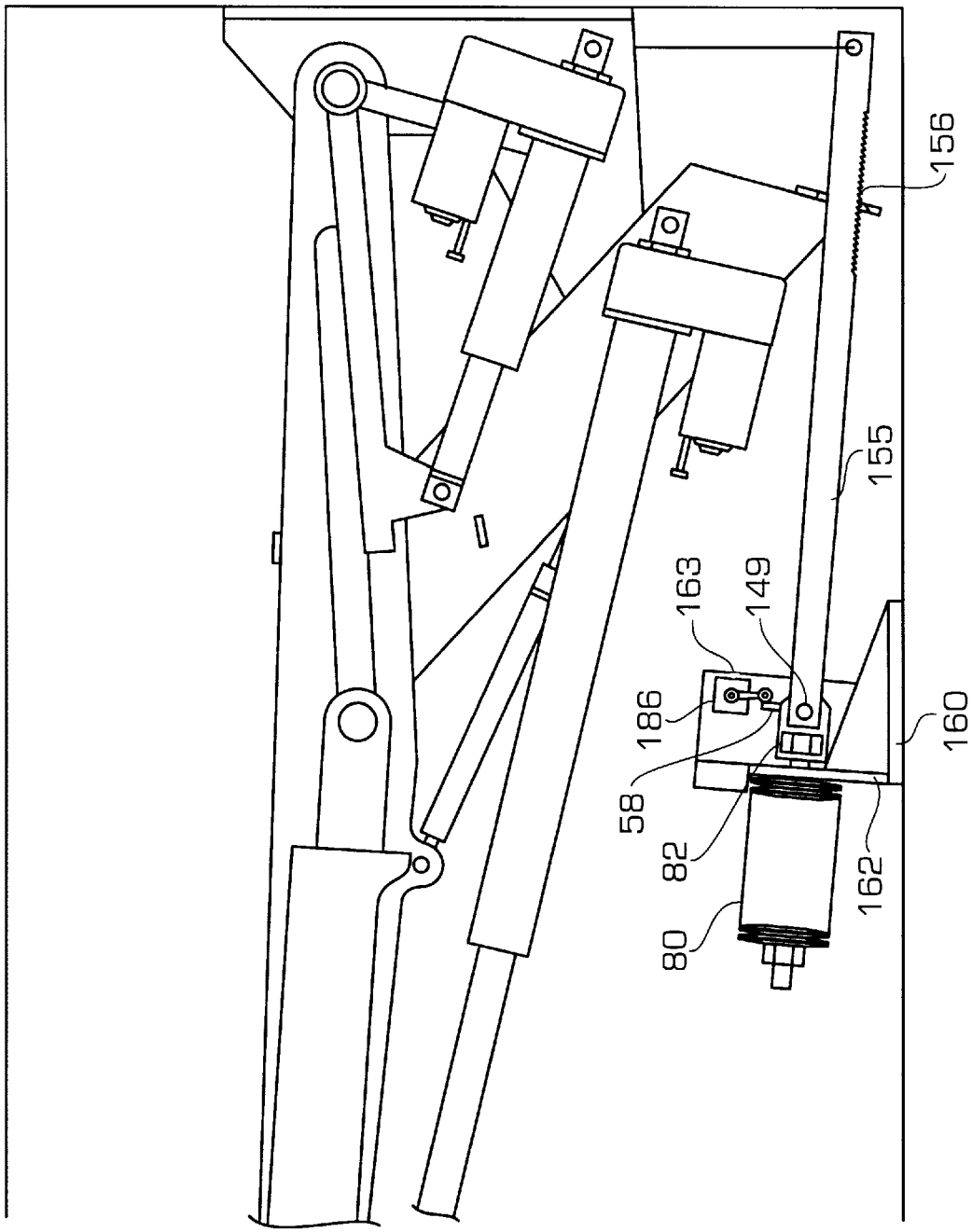
FIG. 12 is an enlarged view of the vehicle restraint of FIG. 11 with the security locking feature engaged.

FIGS. 11–12 illustrate a third embodiment of this invention employing the same vehicle restraint as in the second embodiment but with a simplified security device. The actuator 150 and the arm 145 are replaced with a rack bar 155 having a number of teeth 156. The crossbar 125 has an opening with the lower edge beveled to form a pawl 126. The rack bar 155 is held up in the inoperative position shown in FIG. 11 by a control rod or cable 157. The control rod can be held by a mechanical lever or latch mechanism (not shown). The security function is activated by releasing the control rod 157 and allowing the rack bar 155 to fall so that one of the teeth 156 engages the pawl 126 as shown in FIG. 12. Any attempt to force the hook 120 to lower will cause the rack 155 to pull the clevis 149. If the force exceeds the compression of the spring 80, the clevis 149 will move and cause the target bracket 58 to engage the limit switch 186 to trigger an alarm.

The absence of the limit switch 185 to sense engagement does not provide this third embodiment the same level of security as the other embodiments, but demonstrates a simple manually operated security method which does not require an additional means of powered actuation.

It is apparent that modifications of this invention may be practiced without departing from the essential scope of this invention.

I claim:

1. A vehicle restraint for preventing movement of a vehicle from a parked position comprising:
   a frame mountable at a loading dock,
   a vehicle restraint mechanism having a restraining member movable between a lower inoperative position where said restraining member is out of contact with a vehicle to be restrained and an upper operative position where said restraining member contacts said vehicle and prevents movement from a parked position,
   a linkage pivotally coupling said restraint mechanism to said frame,
   a resilient member coupled to said linkage biasing said restraining member into engagement with said vehicle,
   a security member movable from a stored position to a blocking position that prevents said linkage from lowering so that said restraining member cannot be moved into said inoperative position,
   a spring member to bias said security member into engagement with said linkage and resist downward movement of said restraining member, and a sector plate assembly coupled to said restraining member and actuator coupled to said sector plate assembly to bias said restraining member into said operative position, wherein said security member comprises a latch plate movable from a stored position to said blocking position preventing movement of said sector plate.

2. The vehicle restraint according to claim 1 further comprising a sensor mounted on said restraining member to determine when said restraining member is in contact with said vehicle.

3. The vehicle restraint of claim 1 further comprising an actuator to move said security member to engagement.

4. The vehicle restraint of claim 1 further comprising a limit switch responsive to movement of said security member and an alarm receiving an output of said limit switch.

5. The vehicle restraint of claim 1 further comprising a solenoid to move said sector plate into said blocking position.

6. A vehicle restraint for preventing movement of a vehicle from a parked position comprising;

a frame mountable at a loading dock, a vehicle restraint mechanism operably having a restraining member movable between a lower inoperative position where said restraining member is out of contact with a vehicle to be restrained and an upper operative position where said restraining member contacts said vehicle and prevents movement from a parked position, a first linkage pivotally coupling said restraint mechanism to said frame, a source of power to move said first linkage upward to said operative position, a second linkage coupling said source of power to said first linkage, a resilient member coupled to said first linkage and biasing said restraining member into engagement with said vehicle, a security member movable from a stored position to a blocking position preventing movement of said second linkage in one direction thereby preventing said first linkage from lowering said restraining member into said inoperative position and, a spring member to bias said security member into engagement with said second linkage to prevent downward movement of said restraining member.

7. The vehicle restraint according to claim 6 further comprising a sensor mounted on said restraining member to determine when said restraining member is in contact with said vehicle.

8. The vehicle restraint of claim 6 wherein said source of power comprises a linear actuator to move said security member to engagement.

9. The vehicle restraint of claim 6 further comprising a limit switch responsive to movement of said security member and an alarm receiving an output of said limit switch.

10. The vehicle restraint of claim 6 further comprising a sector plate assembly coupled to said restraining member and actuator coupled to said sector plate assembly to bias said restraining member into said operative position, wherein said security member comprises a latch plate movable from a stored position to said blocking position preventing movement of said sector plate.

11. The vehicle restraint of claim 10 further comprising a solenoid to move said sector plate into said blocking position.

12. The vehicle restraint of claim 6 wherein said restraining member comprises a hook assembly having a pair of arms and hook members defining staggered vehicle restraint positions, a main hook arm assembly carrying said pair of arms and wherein said resilient member biasing said restraining member comprises a gas spring coupled to said main hook arm assembly.

13. The vehicle restraint according to claim 12 wherein said security member comprises an arm pivotable on said main hook arm assembly, an actuator to move said security member into said blocking position against said main hook arm assembly and a compression spring coupling said actuator to said frame.

14. The vehicle restraint of claim 12 wherein said main hook arm assembly further comprises a pawl mounted thereon, security member comprising a releasable control rod coupled to a rack having a series of teeth, whereby by movement of said control rod said rack moves to have said pawl engage one of said teeth thereby inhibiting downward movement of said restraining member.

15. The vehicle restraint of claim 14 wherein said spring member comprises a compression spring coupled to said rack to absorb a downward force applied to said restraining member and a sensor to provide an output if said downward force exceeds the compression of said spring.

* * * * *